Figure 1:
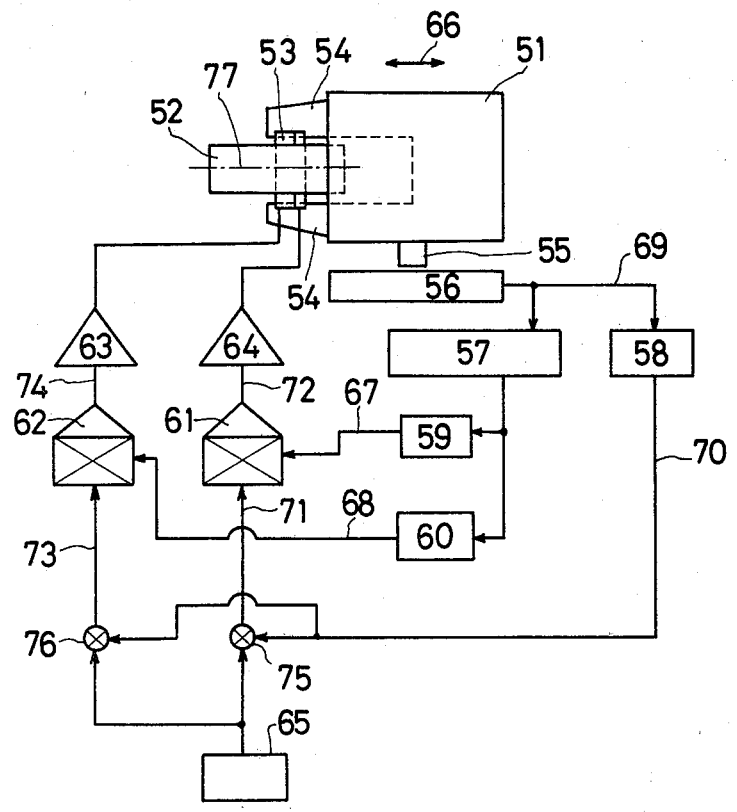

United States Patent [19]

Imahashi

[11] 4,390,827

[45] Jun. 28, 1983

[54] LINEAR MOTOR

[75] Inventor: Issei Imahashi, Yamanashi, Japan

[73] Assignee: Telmec Co., Ltd., Japan

[21] Appl. No.: 231,759

[22] Filed: Feb. 5, 1981

[30] Foreign Application Priority Data

Feb. 13, 1980 [JP] Japan .............................. 55-016284

[51] Int. Cl.³ ............................................. G05B 11/00
[52] U.S. Cl. ................................ 318/687; 318/135;
318/603; 310/12
[58] Field of Search ...................... 318/687, 135, 603;
310/12

[56] References Cited

U.S. PATENT DOCUMENTS 3,657,630  4/1972  Fiet ................................. 318/687 X
4,230,978  11/1980 Gardella et al. ...................... 318/687
4,318,038  3/1982  Munehiro ............................ 318/135

FOREIGN PATENT DOCUMENTS 1552418  9/1979  United Kingdom ................. 318/603

Primary Examiner—B. Dobeck
Attorney, Agent, or Firm—Price, Heneveld, Huizenga & Cooper

[57] ABSTRACT

A novel linear motor making use of a D.C. current and a precise positioning device employing the linear motor and adapted to be used in a semiconductor manufacturing apparatus, are described herein, in which magnetic fields having alternately reversing directions of magnetic paths are formed at equal intervals along a straight line, one set of two coils is placed in this magnetic field as positioned in such manner that when one of the coils crosses the lines of magnetic force to a maximum extent, the other coil may cross the lines of magnetic force to a minimum extent, there coils are mounted on a loading table, conventional feedback is effected from a detector for detecting the position of the loading table via an F-V converter, two memory devices respectively connected to current amplifiers having variable amplification factors are in turn connected to a counter connected to the detector, the current amplifiers are respectively connected to said coils so that an amplified current having a controlled polarity may be passed through the coil crossing more lines of magnetic force according to a program preliminarily set in the memory devices, whereby said one set of coils can be applied with any arbitrary driving force in a fixed direction throughout the entire magnetic field.

6 Claims, 8 Drawing Figures

LINEAR MOTOR

The present invention relates to a novel linear motor making use of a D.C. current, and a precise positioning device employing the linear motor and adapted to be used in a semiconductor manufacturing apparatus.

In the above-described type of positioning devices, generally a loading table is moved and stopped at a high speed and at a high precision, and heretofore most of the positioning devices have used a step motor or a D.C. servo motor and employed the method of rotating a feed screw.

However, in the positioning device employing such method, since it is difficult to give a minute movement of 1 microns or less to a loading table, most of the loading tables have the so-called double structure in which a minute movement is given by separate means. Consequently, the positioning device becomes extremely expensive and complexed, and furthermore, generally the attainable moving speed is slow.

In addition, among the linear motors forming a D.C. servo system, a voice coil type linear motor has been known. Such type of linear motors are used, for example, for positioning a floating head of a magnetic disc memory device. However, in the voice coil type linear motor it is extremely difficult to lenghten a moving stroke, and the linear motor would become very large-sized.

It is one object of the present invention to provide a novel linear motor making use of a D.C. current and having a long moving stroke.

Another object of the present invention is to provide a precise positioning device employing such novel linear motor, which device is simple in structure, capable of following a minute movement of 1 micron or less and fast in a moving speed.

According to one feature of the present invention, there is provided a precise positioning device employing a linear motor, which comprises a stator in which magnetic fields having alternately reversing directions of magnetic paths are juxtaposed at equal intervals along a straight line; two coils placed in said magnetic fields so as to by freely movable and fixed to each other; a loading table fixed to said two coils, a linear encoder for detecting the position of said loading table; an F-V converter connected to said linear encoder on one hand and also connected to voltage adders for said two coils, respectively, on the other hand; counters connected to said linear encoder; two memory devices connected to said respective counters; current amplifiers having variable amplification factors connected respectively to said two memory devices on one hand and also connected to said two coils, respectively, on the other hand; and input means for controlling the movement of said loading table.

Figure 2:
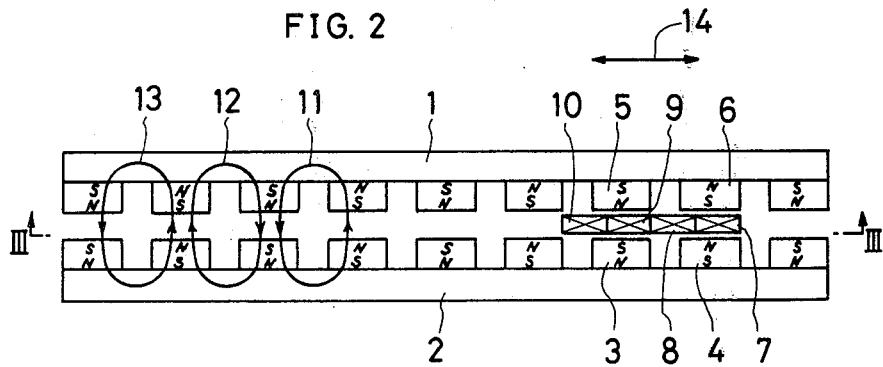
Figure 3:
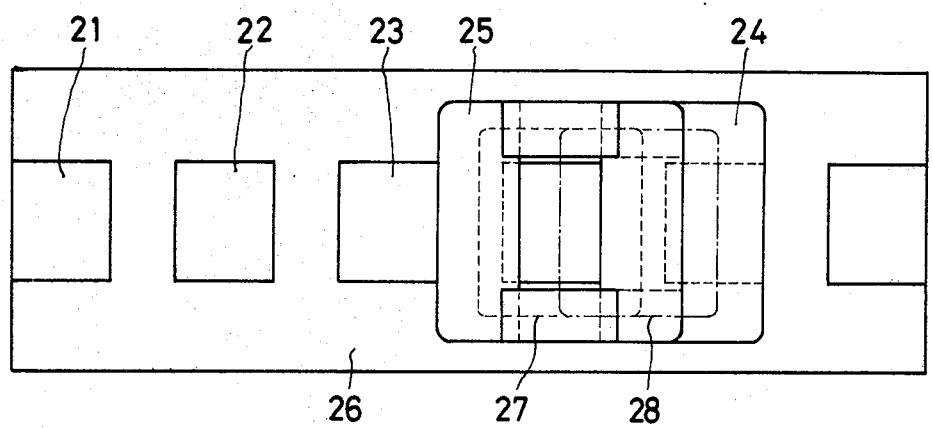
Figure 4:
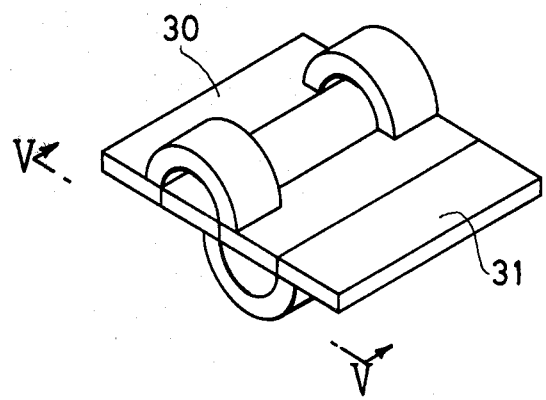
Figure 5:
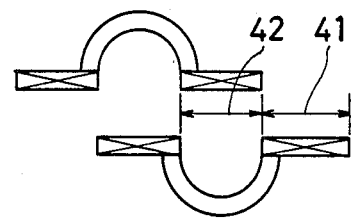
Figure 6:
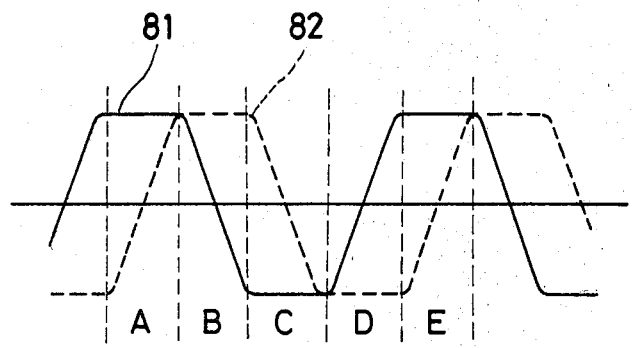
Figure 7:
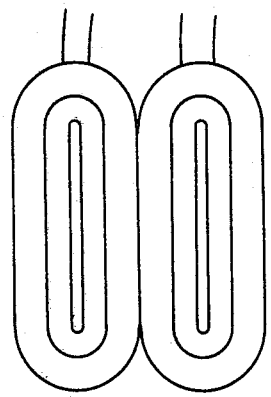
Figure 8:
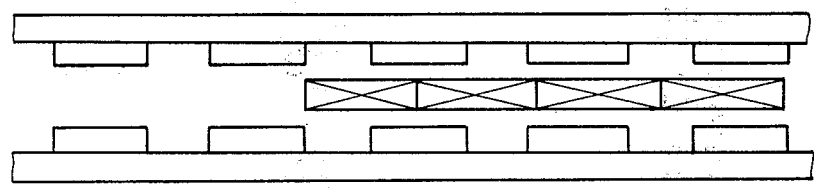

The above-mentioned and other features and objects of the present invention will be more clearly understood by reference to the following description of preferred embodiments thereof taken in conjunction with the accompanying drawings, wherein:

FIG. 1 is a block diagram showing an outline of a precise positioning device employing a linear motor according to one preferred embodiment of the present invention, FIG. 2 is a schematic view showing relative positioning of a stator and coils in the apparatus according to the present invention, FIG. 3 is a schematic view taken along line III—III in FIG. 2 as viewed in the direction of arrows, FIG. 4 is a perspective view of coils to be used in the linear motor according to the present invention, FIG. 5 is a schematic view taken along line V—V in FIG. 4 as viewed in the direction of arrows, FIG. 6 is a diagram showing a driving force exerted upon the coils in the linear motor according to the present invention as a function of the relative positioning between the coils and the stator, FIG. 7 is a plan view showing another configuration of the coils, and FIG. 8 is a schematic view showing a stator to be associated with the coils illustrated in FIG. 7.

Referring now to FIG. 1 of the drawings, reference numeral 51 designates a loading table, which is formed, in the illustrated embodiment, to be movable only in the directions of arrows 66. In this connection, the loading table 51 can be made movable with only a small force by making it float up, for example, with an air cushion. Reference numeral 54 designates holders projected from the loading table 51 for holding coils 53. Reference numeral 52 designates a stator of a linear motor. The force generated in the coils 53 has the same direction as the direction of the arrows 66, and when a driving force is generated by passing a current through the coil 53, the loading table 51 moves in the direction of the arrows 66. Reference numerals 55 and 56 designates members of a position detector for detecting a current position of the loading table 51, which detector is generally called "linear encoder". Linear encoders of optical type, magnetic type, etc. have been known, among which highly precise one has a resolution of 1 micron or less. Reference numeral 57 designates a counter which always holds a current position of the loading table 51, and numeral 58 designates a frequency-voltage (F-V) converter for deriving a moving speed of the loading table 51 from the intervals of the pulses generated from the linear encoder 56. This is generally called "F-V converter" and various types of F-V converters are commercially available. A voltage proportional to the moving speed of the loading table 51 can be obtained by this F-V converter 58, and the generated voltage is applied to voltage adders 75 and 76, respectively. Reference numerals 63 and 64 designate current amplifiers.

In the above-described construction, if the above-described coil 53 is considered as a D.C. servo motor, the construction is similar to that of the heretofore well-known D.C. servo system. In this case the loading table 51 moves back and forth in accordance with a speed signal applied from a control device 65. Thus the basic construction according to the present invention is that of a D.C. servo system, and additional components 59, 60, 61 and 62 are added to the basic construction as will be described later. Thereby, the heretofore known D.C. motor has been modified to a special linear motor.

Now description will be made on the linear motor section forming a principal part of the apparatus according to the present invention as well as the control system for the linear motor section. FIGS. 2 and 3 show the portion of the stator 52 and coils 53 in FIG. 1 in an enlarged scale, FIG. 2 being a cross-section view taken along a dash-dot line 77 in FIG. 1. In FIG. 2, reference numerals 1 and 2 designate magnetic path members for constructing a magnetic circuit, which members also serve as holding members for magnet pieces. Reference numerals 3, 4, 5 and 6 designate a group of permanent magnets. Reference numerals 7 and 9 designate a cross-section of one coil, while numerals 8 and 10 designate a cross-section of the other coil. The coil having its cross-section designated by numerals 7 and 9 in FIG. 2 is a coil designated by reference numeral 24 in FIG. 3, and the other coil having its cross-section designated by numerals 8 and 10 in FIG. 2 is a coil designated by reference numeral 25 in FIG. 3.

FIG. 4 is a three-dimensional representation of the above-referred coils, the coil designated by numeral 24 in FIG. 3 corresponds to a coil 31 in FIG. 4, and the coil designated by numeral 25 in FIG. 3 corresponds to a coil 30 in FIG. 4. In FIG. 3, a dash-dot line 28 represents a center line of the coil 24, while a dotted line 27 represents a center line of the coil 25.

Now let us consider the operations of the coil 24. In the case where the coils are present at the positions illustrated in FIGS. 2 and 3, in the neighborhood of the coil cross-section 7 a driving force in the direction represented by arrows 14 is exerted upon the coil 24 because the coil cross-section 7 is placed in the magnetic field produced by the magnets 4 and 6, and likewise in the neighborhood of the coil cross-section 9 a driving force in the direction represented by arrows 14 is exerted upon the coil 24 because the coil cross-section 9 is placed in the magnetic field produced by the magnets 3 and 5. When a current is passed through the coil 24, the directions of the current at the coil cross-section 7 and at the coil cross-section 9 are opposite to each other, but since the directions of the magnetic fields are also opposite to each other at these coil cross-sections 7 and 9, the driving force exerted upon the coil 24 is the sum of the driving force exerted upon the neighborhood of the coil cross-section 7 and the driving force exerted upon the neighborhood of the coil cross-section 9, and as the directions of these driving force components have the same direction, a large resultant driving force is applied to the coil 24. This resultant driving force itself acts to move the loading table 51.

As described above, with respect to the relative positioning between the coils and magnetic fields illustrated in FIG. 2, it is seen that the performance of the coils in the neighborhood of the illustrated position is the same as the performance of the D.C. motor. Accordingly, so long as the movement is limited to within such a minute range, the loading table 51 shown in FIG. 1 can be subjected to control for positioning by means of the construction of the conventional D.C. servo system. However, in the conventional D.C. servo system, the loading table 51 can be moved only within the range covered by the magnets 4 and 6.

In the linear motor section forming a principal part of the apparatus according to the present invention, a large number of permanent magnet pairs are arrayed as shown in FIG. 2, and the directions of the magnetic field produced by these permanent magnet pairs are alternately reversed. Lines indicating the directions of these magnetic fields are solid line loops 11, 12 and 13 in FIG. 2, and by providing such array of permanent magnet pieces it is possible to make all the magnetic paths form closed loops. The two coils are disposed as staggered by a half pitch from each other. Describing these coils in more detail with reference to FIG. 4, the portions of the coils 30 and 31 to be placed within the magnetic fields are would in a flat shape, and the width 41 of the windings of the coils and the width 42 of the space inside of the coil are made approximately equal to each other.

In one example of the coil pair, the coils are disposed in such configuration that a coil side of one coil may be fitted in the inside space of the other coil as shown in FIG. 4. However, in another example of the coil pair, two coils could be simply disposed side by side and fixed to each other as shown in FIGS. 7 and 8.

In the case of varying the relative positioning between the coils 53 and the stator 52 in FIG. 1 while passing a current through the coil 53, the change of the driving force exerted upon each coil is depicted as a function of the relative positioning in the diagram shown in FIG. 6. With reference to this figure, the abscissa of the diagram indicates the position of the coil relative to the stator, and the ordinate indicates the driving force exerted upon the coil. A solid line curve 81 represents the driving force exerted upon the coil 24, whereas a dotted line curve 82 represents the driving force exerted upon the coil 25. If the coil is displaced by one pitch length of the pitch of the magnet array in the stator, then the driving force is reversed in direction, and if it is displaced by two pitch length, then the driving force is returned to the original direction and magnitude. In FIG. 6, the curves of the driving forces exerted upon the coil 24 and the coil 25, respectively, are displaced just be one-half pitch length from each other, and the cause of this displacement will be obvious by reference to FIG. 2.

As described above, depending upon the position of the coil the magnitude of the driving force exerted upon the coil will vary, and moreover, even the direction of the driving force will vary. Therefore, with only the above-described stator-coil construction it is impossible to establish a D.C. servo system over the entire movable range, although a D.C. servo system may be formed if the movable range is limited to a minute region. What makes it possible to establish a D.C. servo system over the entire movable range, is the arrangement consisting of a counter 57, memory devices 59 and 60, and current amplifiers 61 and 62 having variable amplification factors illustrated in FIG. 1. The memory device 59 or 60 could be a read-only memory which normally includes a D-A converter. However, recently a read-only memory with a D-A converter omitted has appeared, and as a matter of course, such new read-only memories could be employed. As one example of the above-mentioned current amplifier having a variable amplification factor, a multiplier could be used. Especially, a 4-quadrant multiplier (a multiplier performing multiplication of algebraic signs) could be effectively used, because the direction of the current passing through the current amplifier can be also changed. The output from the memory devices 59 and 60 serve as amplification factor control signals for the current amplifiers 61 and 62, respectively, for controlling the current amplification factors of the current amplifiers 61 and 62. More particularly, by providing the memory devices 59 and 60 and the current amplifiers 61 and 62 having variable amplification factors in the conventional D.C. servo system, it becomes possible to vary an amplification degree of the servo system depending upon the position of the coils 53, and in addition, by employing a 4-quadrant multiplier as the amplifier, it also becomes possible to change the direction of the current fed from the current amplifier.

Now description will be made on by how programming the memory devices 59 and 60 a D.C. servo system can be established over the entire movable range of the linear motor shown in FIG. 2.

With reference to FIG. 6, it is assumed that in the range A along the abscissa the amplification degree for the coil 81 is selected to be 1 while the amplification degree for the coil 82 is selected to be 0, in the range B the amplification degree for the coil 81 is selected to be 0 while the amplification degree for the coil 82 is selected to be 1, in the range C the amplification degree for the coil 81 is selected to be $-1$ while the amplification degree for the coil 82 is selected to be 0, in the range D the amplification degree for the coil 81 is selected to be 0 while the amplification degree for the coil 82 is selected to be $-1$, and in the range E the amplification degree for the coil 81 is selected to be 1 while the amplification degree for the coil 82 is selected to be 0. By programming the memory devices 59 and 60 in the above-described manner, it becomes possible to give a movement to the loading device 51 at a speed whose magnitude and direction are always determined by the magnitude and direction of the signals applied to the voltage adders 75 and 76 shown in FIG. 1, and thus as a whole a D.C. servo system can be established. While the above description with reference to FIG. 6 has been made, by way of example, in connection to simple waveforms, in practice the curves representing the variations of the driving forces as functions of the positions of the respective coils would take more complexed shapes. However, by constructing the memory devices 59 and 60 in a finely dividable manner, the necessary measure can be taken, whatever the waveform shown in FIG. 6 may vary.

Upon performing positioning of the loading table 51 by means of the above-described linear motor according to the present invention, the drive signal applied from a control apparatus 65 to this positioning system is dependent upon the distance (including its direction) between the current position of the loading table 51 and the desired point for positioning thereof, and when the loading table 51 has reached the desired point, the drive signal becomes zero. For instance, when the loading table 51 is located on the right side of the desired point the drive signal has a positive sign, whereas when it is located on the left side of the desired point, the drive signal has a negative sign, and as the distance is increased, the magnitude of the drive signal becomes large. By applying such drive signal from the control apparatus 65 to the positioning system the positioning of the loading table can be achieved in principle. However, in practice, by applying a difference between the drive signal dependent upon the current position of the loading table and a signal representing the current speed of the loading table to the positioning system, the so-called hunting of the drive system can be prevented and the positioning operation can be stabilized. This is a quite common practice in the field of a servo control system. The circuit portion in FIG. 1 including the F-V converter 58 and voltage adders 75 and 76, which serve to apply a voltage proportional to the speed of the loading table 51 from the linear encoder 56 through the F-V converter to the voltage adders 75 and 76, is provided for that purpose.

While description has been made above in connection to one preferred embodiment of a linear motor according to the present invention as well as a precise positioning device employing the linear motor, it is a matter of course that the arrangement of the coils and the array of the permanent magnets could be changed without departing from the scope of the present invention.

What is claimed is:

1. A linear motor comprising a stator formed by juxtaposing a large number of magnetic path members for establishing magnetic fields having alternately reversed directions of magnetic paths, along a straight line; first and second coils having a mutually fixed relationship, said coils being disposed within the magnetic fields established by said magnetic path members; first and second current amplifiers having variable amplification factors, said first and second amplifiers being connected to said first and second coils, respectively; a position detector for detecting the position of said coils; a frequency voltage converter for receiving the output of said position detector and providing a signal representative of the speed of said coils relative to said magnetic path members; a counter connected to said position detector for determining the position of said coils relative to said magnetic path members; and two memory devices for receiving the output of said counter and determining variable amplification factors for said current amplifiers for driving said coils relative to said magnetic path members.

2. A linear motor as claimed in claim 1, in which said current amplifier having a variable amplification factor is a 4-quadrant multiplier.

3. A linear motor as claimed in claim 1, in which said two coils are disposed as fixed with each other and as displaced from each other by one-half pitch of the array of said magnetic path members along the moving path of said coils.

4. A precise positioning apparatus employing a linear motor comprising a stator formed by juxtaposing a large number of magnetic path members for establishing magnetic fields having alternately reversed directions along a straight line; first and second coils having a mutually fixed relationship, said coils being disposed within said magnetic fields; a loading table fixed to one of said coils and said stator; first and second current amplifiers having variable amplification factors, said first and second amplifiers being connected to said first and second coils, respectively; a control device for establishing the desired address for said coils and said stator, a position detector for detecting the position of said coils; a frequency voltage converter for receiving the output of said position detector and providing a signal representative of the speed of said coils relative to said magnetic path members; a counter connected to said position detector for determining the position of said coils relative to said magnetic path members; and two memory devices for receiving the output of said counter and determining variable amplification factors for said current amplifiers for driving said coils relative to said magnetic path members.

5. A linear motor as claimed in claim 1 wherein the portions of said first and second coils which extend between said magnetic path members lie in a flat plane.

6. A linear motor as claimed in claim 4 wherein the portions of said first and second coils which extend between said magnetic path members lie in a flat plane.

* * * * *